US006159360A

United States Patent [19]

Gerteis et al.

[11] Patent Number: 6,159,360

[45] Date of Patent: Dec. 12, 2000

[54] INVERTIBLE FILTER CENTRIFUGE INCLUDING A SOLIDS DRIER

[75] Inventors: Hans Gerteis; Gerd Mayer, both of Bietigheim-Bissingen, Germany

[73] Assignee: Heinkel Industriezentrifugen GmbH & Co., Bietigheim-Bissingen, Germany

[21] Appl. No.: 09/301,407

[22] Filed: Apr. 28, 1999

Related U.S. Application Data

[63] Continuation of application No. PCT/EP97/05937, Oct. 28, 1997.

[30] Foreign Application Priority Data

Nov. 22, 1996 [DE] Germany .......................... 196 48 511

[51] Int. Cl.[7] .................................................... B01D 35/18

[52] U.S. Cl. ......................... 210/103; 210/149; 210/175; 210/297; 210/380.3; 34/550; 34/58; 34/68

[58] Field of Search ........................... 210/85, 96.1, 143, 210/103, 149, 175, 138, 141, 297, 299, 380.1, 380.3, 770; 34/58, 60, 68, 550, 558, 559

[56] References Cited

U.S. PATENT DOCUMENTS

| | | | |
|---|---|---|---|
| 4,131,011 | 12/1978 | Ling | 73/29.01 |
| 4,406,795 | 9/1983 | Takacs et al. | 210/771 |
| 4,880,533 | 11/1989 | Hondulas | 210/104 |
| 5,460,717 | 10/1995 | Grimwood et al. | 210/175 |
| 5,865,993 | 2/1999 | Wienicke | 210/181 |

FOREIGN PATENT DOCUMENTS

| | | |
|---|---|---|
| 948 497 | 8/1956 | Germany . |
| 36 15 013 | 6/1987 | Germany . |
| 36 30 920 | 4/1988 | Germany . |
| 43 16 081 | 8/1994 | Germany . |
| 195 29 256 | 8/1996 | Germany . |

*Primary Examiner*—W. L. Walker
*Assistant Examiner*—Terry K. Cecil
*Attorney, Agent, or Firm*—Leydig, Voit & Mayer, Ltd.

[57] ABSTRACT

A solids dryer is post-connected to an invertible filter centrifuge, wherein a dehumidification and drying of the solids takes place in the invertible filter centrifuge by means of centrifugation, pressure gas compression and/or heat convection and in the solids dryer by means of heat contact and/or heat convection. The invertible filter centrifuge and the solids dryer are connected to one another to form a unit via a closure device. Sensors serve to measure the respectively prevailing degree of dehumidification and drying as well as to determine additional operating parameters. The sensors actuate a common control device which regulates the operating parameters. The control device carries out the regulation of the operating parameters automatically in such a manner that the operating times for the dehumidification and drying in the invertible filter centrifuge and in the solids dryer are coordinated with one another and at the same time the mechanical centrifugal energy and the thermal energies in invertible filter centrifuge and solids dryer are distributed in an optimum manner.

10 Claims, 2 Drawing Sheets

INVERTIBLE FILTER CENTRIFUGE INCLUDING A SOLIDS DRIER

This application is a Continuation of application PCT/EP97/05937 filed Oct. 28, 1997.

TECHNICAL FIELD OF THE INVENTION

The invention relates to an invertible filter centrifuge for separating a solids-liquid mixture with a post-connected solids dryer, wherein the solids are dehumidified and dried in the invertible filter centrifuge by means of centrifugation, pressure gas compression and heat convection with the aid of a flow of drying gas and in the solids dryer by means of heat convection with the aid of a flow of drying gas.

BACKGROUND OF THE INVENTION

Invertible filter centrifuges are known (DE 43 16 081 C1), with which a mechanical dehumidification and drying of the filter cake adhering to the drum wall takes place in the rotating centrifugal drum and the filter cake has drying gas flowing through it for additional dehumidification, wherein the efficiency of the dehumidification and drying naturally depends on the temperature and velocity of the gas flowing through. It is also known in the case of such invertible filter centrifuges for the capillaries of the filter cake to be blown free with a gas subject to a relatively high pressure, prior to the drying gas flowing through the filter cake, in order to thus open a path for the drying gas.

In addition, it is known, in those cases in which the dehumidification and drying in the invertible filter centrifuge are not sufficient, to provide thermal units downstream of the centrifuge in the form of a solids dryer, in which the solids withdrawn from the invertible filter centrifuge are treated by means of heat contact by way of heating and/or by means of heat convection with the aid of a flow of drying gas, in order to bring about a further dehumidification and drying of the solids until the desired final value is reached. In many cases it is also necessary to bring about the required final degree of drying (residual moisture) by means of a final drying in a vacuum. A deagglomeration of the solids by means of alternating application of a vacuum and pressure is also possible. As a rule, the final drying or deagglomeration takes place in a vacuum in the solids dryer although these processes can also, in principle, be carried out in the invertible filter centrifuge.

Air or another, in particular, an inert gas are considered as drying gas. If the drying gas is contaminated with toxic agents during the dehumidification and drying process not only in the invertible filter centrifuge but also in the solids dryer, it must be either disposed of or treated in a processing plant so that the cleaned drying gas can be used again in the cycle for the dehumidification and drying in the invertible filter centrifuge and in the solids dryer and the consumption of inlet gas is reduced to a minimum.

When the solids predried in the invertible filter centrifuge are transferred into the solids dryer, larger solids agglomerates, which can result due to too great a compression or capillary binding forces which are too high, often make themselves interferingly noticeable. In this case, a deagglomeration, i.e. a reduction in size, must be carried out prior to the solids entering the solids dryer.

During conventional operation of invertible filter centrifuges and solids dryers, these are decoupled, i.e. each of these units is dimensioned and controlled separately with respect to the result to be attained for a certain product. In this respect, in the concrete case of use the size of each unit must be adjusted according to the worst results which might occur and are to be taken into account, wherein the resting time in the invertible filter centrifuge or in the solids dryer can be too long, for example, due to error batches which have to be included in calculations.

Since, in the case of known systems, neither the dehumidification and drying in the invertible filter centrifuge nor the dehumidification and drying in the solids dryer can be coordinated with one another in their results, the units consisting of invertible filter centrifuge and solids dryer often work uneconomically as a result of maintenance or stoppage times. Also, such units are often designed with too high a safety level with respect to fulfilling specific production expectations which directly influences the manufacturing costs of the units and their operating costs negatively.

The degree of dehumidification which can be achieved in the invertible filter centrifuge by mechanical centrifugation can also be limited and so, for example, as a result of a thixotropic behavior of the separated solids these can adhere to or "cake on" undesired locations and make further transport of the product into the solids dryer more difficult. This may also result in undesired stoppage times. Moreover, additional equipment may be necessary which likewise drives up the cost of required investments.

The object of the invention is to further develop a generic invertible filter centrifuge with a post-connected solids dryer such that invertible filter centrifuge and solids dryer complement one another synergetically during operation in order to achieve a specific degree of dehumidification, wherein the use of the thermal energy of the drying gas is intended, in particular, to be optimized.

This object is accomplished by claim 1.

BRIEF SUMMARY OF THE INVENTION

The operation of an inventive system is therefore ruled by the concept of dividing the drying work in an optimum manner between the invertible filter centrifuge and the solids dryer dependent on product and results, wherein dehumidification and drying processes are, as required, not carried out in the invertible filter centrifuge but in the solids dryer and vice versa.

BRIEF DESCRIPTION OF THE DRAWINGS

The following description of a preferred embodiment of the invention serves to explain the invention further in conjunction with the attached drawings. These show.

DETAILED DESCRIPTION OF THE INVENTION

Figure 1:
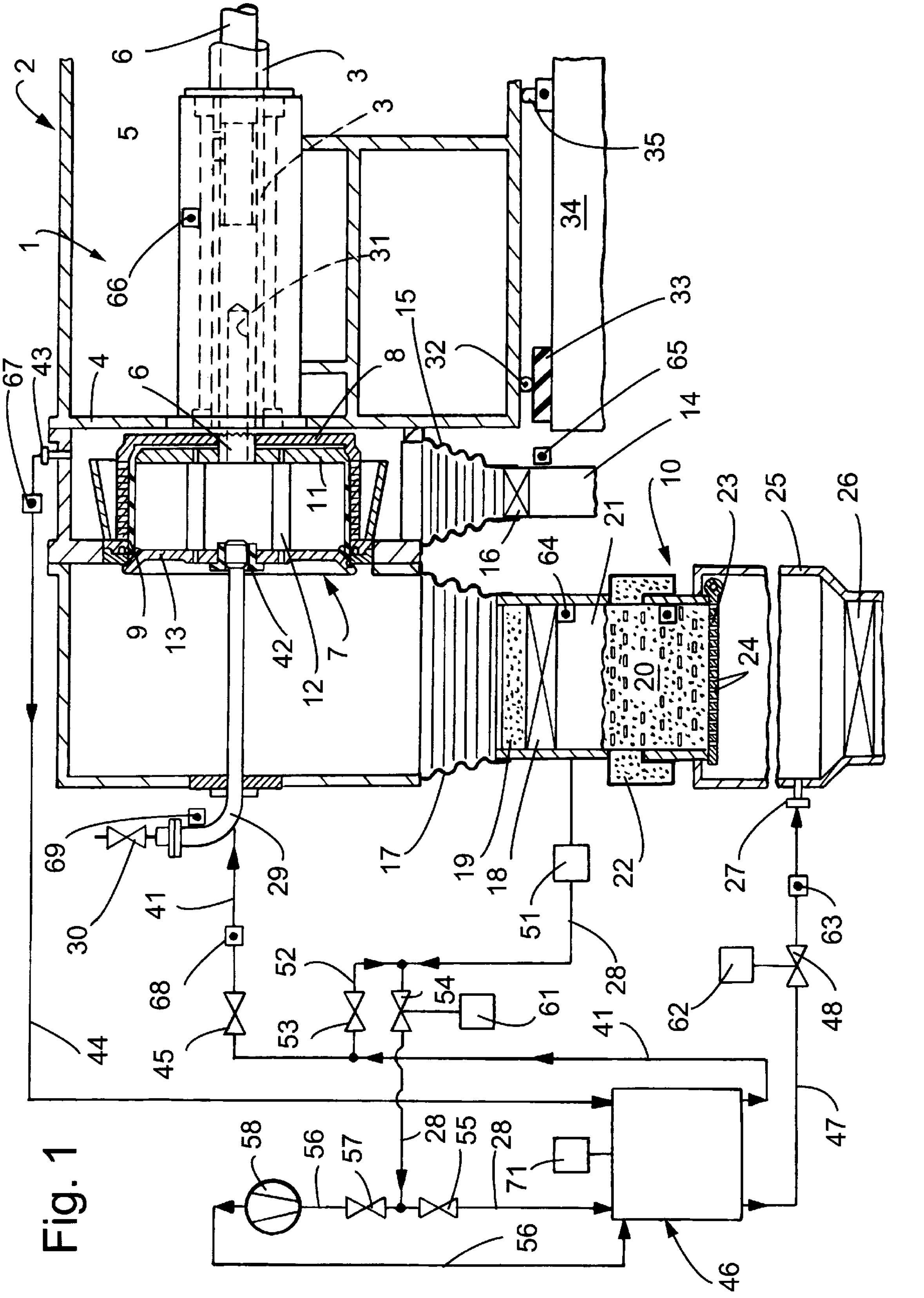
FIG. 1 schematically an invertible filter centrifuge with post-connected solids dryer with the centrifugal drum closed and FIG. 2 the invertible filter centrifuge from FIG. 1 with the centrifugal drum opened.

The invertible filter centrifuge 1 illustrated in the drawings comprises in a machine housing 2 a rotatably mounted hollow shaft 3 which can be caused to rotate rapidly via a motor (not illustrated). The hollow shaft 3 extends beyond a partition wall 4 closing the machine housing 2 at its front side and has an axially extending wedge-shaped groove (likewise not illustrated), in which a wedge-shaped member 5 is axially displaceable. This wedge-shaped member 5 is rigidly connected to a shaft 6 which is displaceable in the interior of the hollow shaft 3 and thus rotates together with the hollow shaft 3 but is axially displaceable in it.

A pot-shaped centrifugal drum 7 is flange-mounted to the end of the hollow shaft 3 projecting beyond the partition wall 4 so as to be non-rotatable. At its circular-cylindrical side wall the centrifugal drum 7 has radially extending through openings. The drum 7 is closed on one side by a base 8 and is open at its end face located opposite the base 8. A filter cloth 9 of an essentially circular-cylindrical design is sealingly fixed at the edge surrounding the open end face and the opposite edge of the filter cloth is sealingly connected to a base plate 11. The base plate 11 is rigidly connected to the displaceable shaft 6 freely penetrating the base 8.

Figure 2:
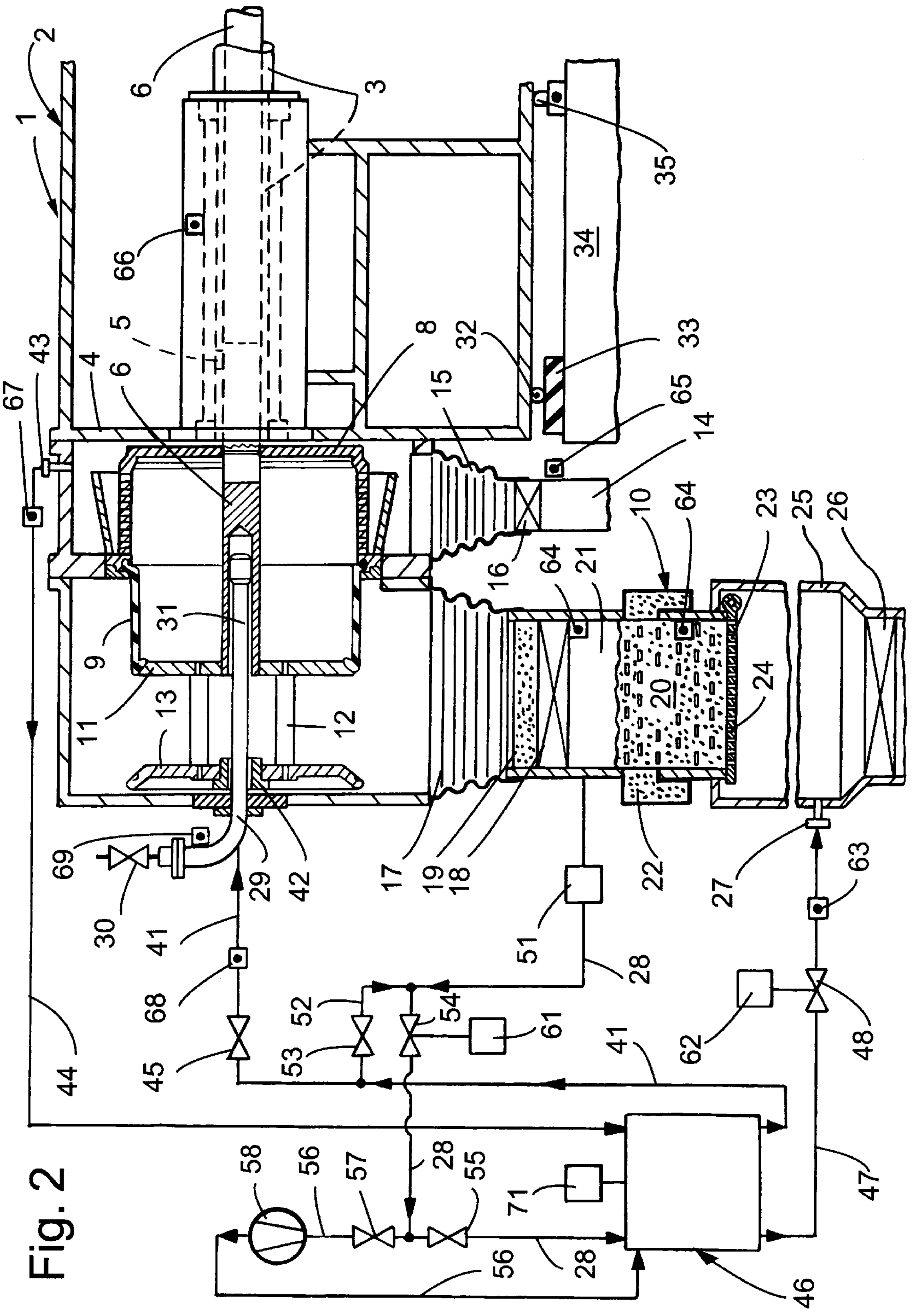

A centrifugal chamber lid 13 is rigidly attached to the base plate 11 via spacer bolts 12, leaving a space therebetween. In FIG. 1 this lid sealingly closes the interior of the centrifugal drum 7 and in FIG. 2 is lifted free from the centrifugal drum 7 together with the base plate 11 by axial displacement of the shaft 6 out of the hollow shaft 3. In FIG. 1, the filter cloth 9 is turned in towards the inner side of the centrifugal drum 7, in FIG. 2 this cloth is turned outwards.

The closed centrifugal drum 7 (FIG. 1) rotates in a specific section of the machine housing 2. Liquid (filtrate) which is pressed out of the centrifugal drum 7 passes into a discharge pipe 14 which is flexibly connected to the machine housing 2 via a bellows 15. The discharge pipe 14 can be closed by a check valve 16. In an additional section of the machine housing 2, which—cf. FIG. 2—accommodates the inverted filter cloth 9 and the centrifugal chamber lid 13, the solids separated from the liquid are catapulted from the filter cloth 9. This section of the machine housing 2 is flexibly connected to a solids dryer 10 via a bellows 17. The solids dryer 10 can be sealingly closed in relation to the machine housing 2 by a check valve 18. In the illustrated embodiment, a deagglomerator 19 is arranged between machine housing 2 and solids dryer 10 (above the check valve 18) and this serves for the preceding reduction in size of the solids 20 passing into the solids dryer. This deagglomerator is not absolutely necessary.

The actual solids dryer 10 receiving the solids 20 which have been catapulted away and, where applicable, reduced in size, comprises a tank 21 which can be heated by a, for example, electrical heating device 22. The heat is thereby transferred to the solids 20 by way of heat contact, whereby the solids 20 are subject to drying.

The tank 21 can be closed at its lower side by a pivotable flap 23 which is provided with through perforations 24. With flap 23 opened, the dried solids 20 pass into an additional tank 25, the outlet of which can be optionally closed in a sealed manner by a check valve 26. A product receiving vessel, into which the completely dried solids 20 can be filled when the check valve 26 is opened, can be connected to the outlet of the tank 25. The tank 25 has a short inlet connection pipe 27 for drying gas which flows through the perforations 24 of the flap 23 and through the solids 20 in the tank 21 and flows away via a pipe 28.

The invertible filter centrifuge 1 is also provided with a filler pipe 29 which serves for the supply of a suspension which is to be separated into its solid and liquid components into the interior of the centrifugal drum 7 (FIG. 1) and in the operating state illustrated in FIG. 2 penetrates a bore 31 of the displaceable shaft 6, wherein the displacement of the shaft 6 and thus the opening and closing of the centrifugal drum 7 takes place via drive motors (not illustrated, located to the right in the drawings), for example, hydraulically.

During centrifugal operation, the invertible filter centrifuge 1 takes up the position illustrated in FIG. 1. The displaceable shaft 6 is withdrawn into the hollow shaft 3, whereby the filter cloth 9 is turned into the centrifugal drum in such a manner that in its interior it covers the through openings in the drum casing. The centrifugal chamber lid 13 thereby closes the open end face of the centrifugal drum 7. When the centrifugal drum 7 rotates rapidly, suspension to be filtered is continuously introduced via the filler pipe 29. The liquid components of the suspension enter the machine housing 2 as filtrate through the filter cloth 9 and the through openings in the drum casing and are then guided into the discharge pipe 14. The solid particles of the suspension are retained by the filter cloth 9 in the form of a filter cake.

When the centrifugal drum 7 continues to rotate—usually more slowly—and after the supply of suspension has been switched off at the filler pipe 29 with a valve 30, the shaft 6 is now displaced (to the left) in accordance with FIG. 2, whereby the filter cloth 9 is turned outwards and the solid particles adhering to it are catapulted outwards. The solid particles pass—where applicable after passing through the deagglomerator 19—when the check valve 18 is opened into the tank 21 of the solids dryer 10 where the solids 20 are further dehumidified and dried in the manner already indicated above.

After the solids 20 have been completely discharged from the filter cloth 9, the invertible filter centrifuge is brought back into the operating position according to FIG. 1 by moving the shaft 6 back again, wherein the filter cloth 9 turns back in the opposite direction. In this way, it is possible to operate the invertible filter centrifuge 1 with a constantly rotating centrifugal drum 7.

The described arrangement, including machine housing 2 and centrifugal drum 7, is designed to be rigid in itself and mounted for pivoting about a horizontal hinge pin 32. The hinge pin 32 is, for its part, arranged on an elastic buffer element 33 which, for its part, rests on a stationary base 34 connected, for example, to the ground. A force measuring element 35 is arranged between the machine housing 2 and the base 34 at a distance from the hinge pin 32. The entire arrangement thus acts as a type of beam balance: As a result of the substance introduced into the centrifugal drum 7 via the filter pipe 29, the side of the invertible filter centrifuge 1 located to the left of the hinge pin 32 is loaded, whereby the force measuring element 35, which is located to the right of the hinge pin 32 and can be acted upon, for example, by traction, is influenced accordingly. The weight measured in this way can be utilized for controlling the amount filled into the centrifugal drum 7. The force measuring element 35 can also be utilized as a sensor for the present degree of dehumidification of the solids since the centrifuged liquid leads to a reduction in weight.

The bellows 15, 17 mentioned above on filtrate discharge pipe 14 and solids dryer 10 prevent any interference of the weight measurement because they decouple the "beam balance" in this respect from the stationary parts 14 and 10. Such a decoupling means—not visible in the drawings—is also provided, of course, at the filler pipe 29, for example, in the form of a hose which is likewise of a bellows type, is located outside the machine housing 1 and forms part of the filler pipe 29.

As illustrated, the filler pipe 29 is connected to a pipe 41, via which a gas can be introduced into the interior of the centrifugal drum 7. The free end of the filler pipe 29 is introduced into the centrifugal drum 7 in a gas-tight manner for this purpose via a rotatable seal 42. In this way, a gas subject to a relatively high pressure can be conducted into the interior of the centrifugal drum 7 and serves to blow through the capillaries of the solids (filter cake) adhering to the filter cloth 9 which are still filled with moisture. Furthermore, a drying gas preheated to a specific temperature can also be introduced into the closed centrifugal drum 7 via the pipe 41 and this gas flows through the filter cake and dries the solids. The exhaust gas, which has passed through the solids, is discharged via a short outlet connection pipe 43 and a pipe 44. In this way, the purely mechanical centrifugal drying can be combined with a drying by way of heat convection with the aid of a flow of gas. Moreover, a pressure gas compression of the filter cake for blowing free its capillaries is possible.

The pipe 41, which contains a check valve 45, is connected at its end located opposite the filler pipe 29 to a device 46 for supplying the gases serving the specified purposes. The device 46 contains (in a manner known per se and not illustrated) apart from a gas source, in particular, a compressor and heating means in order to bring the gas supplied via the filler pipe 29 to the desired pressure and the desired temperature. The device 46 also serves at the same time for the reprocessing of the exhaust gas supplied via the pipe 44. For this purpose, the device 46 contains in a manner known per se, in particular, dehumidification means (condensers), filter means, gas washing means, adsorption means and the like. The reprocessed gas is supplied to the invertible filter centrifuge 1 again, circulating via the pipe 41.

Drying gas can be conveyed from the device 46 via a pipe 47, which is connected to the short inlet connection pipe 27 on the tank 25 and contains a valve 48, into the solids dryer 10 where it passes through the solids 20, dries them and is discharged via the pipe 28. The pipe 28 transports the exhaust gas loaded with moisture in the manner apparent from the drawings back to the device 46 where it is processed again and supplied to the solids dryer 10 again, circulating via the pipe 47.

The pipe 28 contains a filter 51 for separating toxic agents in the flow path behind the solids dryer 10. The filter 51 can be backwashed via a pipe 52 with valve 53 branching off the pipe 41. During the backwashing, a valve 54 provided in the pipe 28 is closed.

A pipe 56 with valve 57, which contains a vacuum pump 58 (suction pump) and leads back to the device 46, branches off the pipe 28 which contains an additional valve 55 in the vicinity of the device 46 and so gas withdrawn from the vacuum pump 58 can also be reprocessed. With valves 53, 55 closed and valves 54, 57 opened, a vacuum (underpessure) can thus be generated in the tank 21 of the solids dryer 10 which favors the dehumidification of the solids 20 in the tank 21. Normally, the valve 48 in the pipe 47 is closed in this case. It may, however, be favorable to open the valve 48 slightly so that a small amount of drying gas enters via the pipe 47 and flows through the solids 20 as a so-called "creeping gas". This creeping gas serves for the better entrainment and discharge of the vapor resulting in the vacuum via the pipe 28.

With the aid of the vacuum pump 58, the solids 20 in the tank 21 can also be subjected via the pipe 28 to a change in pressure which leads to a deagglomeration or reduction in size of the solids 20. The cause of this is the vapor pressure resulting in the agglomerated solids 20. In order to carry out this deagglomeration by way of a change in pressure, the valve 54 in the pipe 28 and the valve 48 in the pipe 47 are alternatingly opened and closed under the vacuum conditions described above. The valves 54 and 48 are connected to corresponding control means 61 and 62, respectively, for this purpose.

The system illustrated in the drawings contains apart from the sensor already mentioned, which is designed as a force measuring element 35 and serves, for example, for establishing the degree of dehumidification, additional sensors: A sensor 63 is arranged on the pipe 47 and this serves to measure pressure and/or temperature of the drying gas supplied via this pipe 47. Additional sensors 64, which are arranged on the solids dryer 10, serve to determine the temperature and/or the residual moisture of the solids 20 or the temperature and/or the moisture content of the exhaust gas in the dryer 10. A sensor 65 on the liquid discharge pipe 14 is used to determine the rate of flow and/or the pH value of the filtrate. A sensor 66 on the shaft 3 of the invertible filter centrifuge 1 serves to measure the rotational speed of the centrifugal drum 7. The temperature of the exhaust gas and the amount of moisture contained in it can be ascertained via a sensor 67 in the exhaust gas pipe 44. A sensor 68 in the pipe 41 serves to determine the pressure and the moistness of the gas supplied to the centrifugal drum 7 via the filler pipe 29. Finally, a sensor 69 is arranged on the filler pipe 29 to sense the rate of flow and/or the temperature of the suspension supplied. All these sensors, to which additional sensors may be added if required, are connected to a control device 71, which is connected to the device 46 for supplying and reprocessing the required gases, via lines which are not illustrated separately in the drawings for the sake of clarity. This control device 71 can be programmed in a manner known per se so that the operating cycle of the described arrangement may be controlled automatically in a controlled manner regulating itself, wherein the duration and intensity, in particular, of the drying processes running individually, i.e., for example, the duration of the centrifugation process or the duration of the supply of drying gas via the pipe 47, are coordinated accordingly. Details concerning these control processes will be explained in the following.

Important for the functioning of the described arrangement for the separation of liquid and solids and subsequent dehumidification and drying of the solids is the mechanical sealed separation of the invertible filter centrifuge 1 from the solids dryer 10 by means of the closure element formed by the check valve 18. Invertible filter centrifuge 1 and solids dryer 10 do form a unit or an overall system but both the invertible filter centrifuge 1 and the solids dryer 10 are each a separate, complete system.

All the measures which lead to the drying of the solids in the solids dryer 10 do not impair the processes running at the same time in the invertible filter centrifuge 1, Drying in a fluid or flight bed can also be considered for the drying processes in the solids dryer 10 in addition to the contact drying (heating device 22), convective drying (supply of drying gas via the pipe 47) and vacuum drying (vacuum pump 58) already mentioned. This drying is generated in the tank 21 of the solids dryer 10 by means of a drying gas supplied via the pipe 47 at a correspondingly high pressure. As a result of the separation of the two systems by the check valve 18, any filling control of the centrifugal drum 7 carried out, for example, gravimetrically or radiometrically ($\gamma$ rays) as well as, where applicable, a flow of gas introduced into the machine housing 2 for the purpose of sealing are, moreover, not influenced by the processes in the solids dryer 10.

When, as illustrated and described, the gases supplied via the pipes 41 and 47 are returned via the pipes 44 or 28 and used again after reprocessing in the device 46, a particularly favorable possibility results of distributing the relevant gases expediently and in an energy-saving manner, i.e., economically to the two systems of the invertible filter centrifuge 1 or of the solids dryer 10.

An example for such a distribution of the flow of gas is specified in the following, wherein the distribution is carried out not only in the invertible filter centrifuge 1 but also in the solids dryer 10 in two respective stages or process steps.

In the invertible filter centrifuge 1, the steps of filling, intermediate centrifugation, washing and final centrifugation, where applicable centrifugation under pressure, are carried out in a first stage. In this stage, no gas is required for all the steps, with the exception of centrifugation under pressure, and only a small amount of gas for the pressure centrifugation.

In the second stage, gas flows through the solids (filter cake) in the invertible filter centrifuge 1 for the purpose of a convective drying. The result of drying is thereby dependent not only on the state of the gas (moistness, temperature) but also on the amount of gas and the velocity of flow. In this stage, a relatively large amount of gas is required.

In the solids dryer 10, the conditions are quite the reverse with respect to the processes in the invertible filter centrifuge 1 described above, In a first stage, the solids 20 in the tank 21 have a large amount of gas flowing through them, even when an additional contact drying via the heating device 22 is used. When a final drying subsequently takes place in a second stage in the solids dryer 10 under vacuum, no gas flow-through is theoretically required. However, it has, as already mentioned, proved to be advantageous to have a small amount of gas, a so-called "creeping gas", flowing through the solids 20 because, as a result, the transport of the last liquid vaporized under the influence of the vacuum is made easier. In this second stage, practically no or only an extremely small amount of gas is, however, required.

An energetically favorable distribution of the entire dehumidification and drying process as well as the division into the above-mentioned stages can be established by way of tests, wherein processing aspects and cost parameters can be taken into consideration, The distribution thus calculated is, however, often applicable only for a specific moment in the entire process. Many products are not homogeneously distributed in a suspension or have, for example, varying grain sizes on account of composition crystallization or grain breakage. Moreover, a frequent change in products takes place in systems of the type described, wherein the optimum settings for the operating data have to be redetermined each time.

The optimum splitting into the individual drying stages not only in the invertible filter centrifuge 1 but also in the solids dryer 10 is achieved by means of a self-regulating process in the sense of a control loop, as described above, wherein, as likewise already specified, several sensors and the control device 71, which is connected to the device 46 supplying the drying gas, are used. As a result, the smallest possible overall time for the overall separation of liquid and solids, including dehumidification and drying of the solids, can be achieved when the dehumidification and drying processes in the invertible filter centrifuge 1 and in the solids dryer 10 are continually monitored by the sensors which respond to temperature, moisture, weight, rate of flow, pressure etc. The measured values are then constantly compared with the target values to be attained for the dehumidification and drying not only in the invertible filter centrifuge 1 but also in the solids dryer 10. The target values, for their part, are thereby based on known or calculated operating data which are decisive for an economic dehumidification and drying.

If the predetermined target values are reached, the drying process in the solids dryer 10 is terminated and, at the same time, the drying process in the invertible filter centrifuge 1 is interrupted. The solids dryer 10 is emptied by opening the flap 23, and new, predried solids are transferred into the solids dryer 10 from the invertible filter centrifuge 1.

If the drying process in the solids dryer 10 takes shape such that the target values are still not reached, even when the invertible filter centrifuge 1 has already reached its target value, the result of drying in the invertible filter centrifuge 1 can be improved, for example, by increasing the gas throughput in the centrifugal drum 7, increasing the temperature of the drying gas, etc. The rotational speed of the centrifuge can likewise be increased, where applicable, in order to improve the mechanical drying (removal of water). As a result, a product predried to a greater extent can be supplied to the solids dryer and this can be dried in a shorter time in the solids dryer. The operating times of invertible filter centrifuge and solids dryer are thereby coordinated harmoniously with one another. In the reverse case, if the target values in the solids dryer 10 are reached before the invertible filter centrifuge 1 has reached its target values, the operating data of the solids dryer 10 can be readjusted accordingly. A readjustment of the operating data not only of the invertible filter centrifuge 1 but also of the solids dryer 10 is also possible in order to thus bring about a harmonious or synergetic interaction of these two units.

In accordance with the procedure suggested here, the systems formed by the invertible filter centrifuge 1 and the solids dryer 10 optimize themselves with the aim of, for example, a minimum overall operating time, wherein the ratios of the dehumidification achieved mechanically by centrifugation and the dehumidification carried out thermally by means of drying gas can differ considerably from one another with respect to time and results.

The operating cycle of the system consisting of the invertible filter centrifuge 1 and the solids dryer 10 can also be controlled, in principle, such that fixed times established, for example, for the respective product by means of tests are specified, and after the respective expiration of these times the dehumidification and drying processes in the invertible filter centrifuge 1 and the solids dryer 10 are interrupted. It is possible, for example, to distribute the dehumidification and drying times in invertible filter centrifuge 1 and solids dryer 10 in the ratio 1:1 or also in other ratios, depending on the actual operating conditions and target values to be achieved whilst retaining as economic and efficient a mode of operation as possible.

The present disclosure relates to the subject matter disclosed in International Application No. PCT/EP97/05937 (WO 98/23380) of Oct. 28, 1997, the entire specification of which is incorporated herein by reference.

What is claimed is:

1. An invertible filter centrifuge apparatus for separating a solids-liquid mixture comprising (a) an invertible filter centrifuge, having a sealing lid (b) a solids dryer, (c) sensors, and (d) a common control device, wherein (i) solids are dehumidified and dried in the invertible filter centrifuge by means of centrifugation, pressure gas compression and heat convection with the aid of a flow of drying gas, and the solids are dehumidified and dried in the solids dryer by means of heat convection with the aid of a flow of drying gas, (ii) the invertible filter centrifuge and the solids dryer are connected to one another to form a unit via a closure device that separates the invertible filter centrifuge and solids dryer in a sealed relationship, (iii) the sensors are arranged on the invertible filter centrifuge and on the solids dryer to measure the degree of dehumidification and drying, respectively, prevailing there, (iv) the common control device being actuatable by signals generated by the sensors and regulating operating data, and (v) the control device carries out the regulation of the operating data automatically so that operating times for the dehumidification and drying in the invertible filter centrifuge and in the solids dryer are coordinated with one another and at the same time the mechanical centrifugal energy and the thermal energies in the invertible filter centrifuge and solids dryer are distributed in an economically optimum manner.

2. The invertible filter centrifuge apparatus of claim 1, wherein the invertible filter centrifuge and the solids dryer are connected to a common device for supply of the drying gas.

3. The invertible filter centrifuge apparatus of claim 2, wherein the control device is connected to the common device and carries out respective distributions of the operating times and energies in the invertible filter centrifuge and solids dryer automatically.

4. The invertible filter centrifuge apparatus of claim 3, wherein fixed times are entered in the control device, and the dehumidification and drying processes in the invertible filter centrifuge and in the solids dryers respectively, are terminated after the expiration of said fixed times.

5. The invertible filter centrifuge apparatus of claim 1, wherein the invertible filter centrifuge and the solids dryer are connected to a common device for reprocessing of the drying gas.

6. The invertible filter centrifuge apparatus of claim 5, wherein the control device is connected to the common device and carries out the respective distributions of the operating times and energies in the invertible filter centrifuge and solids dryer automatically.

7. The invertible filter centrifuge apparatus of claim 6, wherein fixed times are entered in the control device, and the dehumidification and drying processes in the invertible filter centrifuge and in the solids dryer, respectively, are terminated after the expiration of said fixed times.

8. The invertible filter centrifuge apparatus of claim 1, further comprising a heating device provided on the solids dryer, whereby the solids are heatable via said heating device as a result of heat contact.

9. The invertible filter centrifuge apparatus of claim 1, further comprising a deagglomerator arranged between the invertible filter centrifuge and the solids dryer.

10. The invertible filter centrifuge apparatus of claim 1, wherein pipes subject alternatingly to overpressure and underpressure carry out a change in pressure at the solids dryer to deagglomerate the solids.

* * * * *